US009176963B2

(12) United States Patent
Callahan et al.

(10) Patent No.: US 9,176,963 B2
(45) Date of Patent: Nov. 3, 2015

(54) MANAGING COUNTERS IN A DISTRIBUTED FILE SYSTEM

(75) Inventors: Michael J. Callahan, Vancouver, WA (US); Terence M. Rokop, Aloha, OR (US); David L. Phelps, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1717 days.

(21) Appl. No.: 12/261,068

(22) Filed: Oct. 30, 2008

(65) Prior Publication Data

US 2010/0115009 A1 May 6, 2010

(51) Int. Cl.
*G06F 7/00* (2006.01)
*G06F 17/30* (2006.01)

(52) U.S. Cl.
CPC ................ *G06F 17/30067* (2013.01)

(58) Field of Classification Search
None
See application file for complete search history.

(56) References Cited

U.S. PATENT DOCUMENTS

| | | | |
|---|---|---|---|
| 5,317,739 A | 5/1994 | Elko | |
| 5,940,813 A | 8/1999 | Hutchings | |
| 6,148,333 A * | 11/2000 | Guedalia et al. | 709/219 |
| 6,175,900 B1 | 1/2001 | Forin | |
| 6,874,062 B1 | 3/2005 | Goldberg | |
| 6,963,882 B1 | 11/2005 | Elko | |
| 7,100,089 B1 | 8/2006 | Phelps | |
| 7,243,115 B2 | 7/2007 | Manley | |
| 7,328,305 B2 * | 2/2008 | Kleiman et al. | 711/114 |
| 7,376,679 B2 * | 5/2008 | Pasupathy | 1/1 |
| 7,533,137 B1 | 5/2009 | Timpanaro-Perrotta | |
| 7,539,988 B1 * | 5/2009 | Hersh | 718/100 |
| 7,698,708 B1 | 4/2010 | Lent | |
| 7,873,619 B1 | 1/2011 | Faibish | |
| 7,890,555 B2 | 2/2011 | Gunda | |
| 8,312,242 B2 | 11/2012 | Casper | |
| 8,560,524 B2 | 10/2013 | Kingsbury | |
| 8,874,627 B2 | 10/2014 | Callahan | |
| 2003/0158834 A1 | 8/2003 | Sawdon | |
| 2003/0182389 A1 | 9/2003 | Edwards | |
| 2005/0246397 A1 | 11/2005 | Edwards | |
| 2005/0246612 A1 | 11/2005 | Leis | |
| 2006/0161678 A1 | 7/2006 | Bopardikar | |
| 2006/0282471 A1 * | 12/2006 | Mark et al. | 707/200 |
| 2006/0288026 A1 | 12/2006 | Zayas | |
| 2007/0282977 A1 * | 12/2007 | Yano et al. | 709/218 |
| 2008/0005133 A1 | 1/2008 | Khalidi | |
| 2008/0133538 A1 * | 6/2008 | Chavez et al. | 707/10 |
| 2008/0172430 A1 * | 7/2008 | Thorstensen | 707/206 |
| 2008/0275925 A1 * | 11/2008 | Kimmel | 707/204 |
| 2009/0019047 A1 | 1/2009 | Anderson | |
| 2009/0154486 A1 * | 6/2009 | Archer et al. | 370/445 |
| 2009/0193122 A1 | 7/2009 | Krishamurthy | |
| 2009/0228511 A1 * | 9/2009 | Atkin et al. | 707/102 |

(Continued)

FOREIGN PATENT DOCUMENTS

WO    2010050943 A1    5/2010
WO    2010050944 A1    5/2010

*Primary Examiner* — Hosain Alam
*Assistant Examiner* — Thu Nga Nguyen
(74) *Attorney, Agent, or Firm* — Trop, Pruner & Hu, P.C.

(57) ABSTRACT

One embodiment is a method that divides a cluster file system into multiple segments with each segment including one or more local counters. The method then checks for inconsistencies and corrects discovered inconsistencies in each of the local counters while the file system remains online and available for use.

15 Claims, 6 Drawing Sheets

(56) References Cited

U.S. PATENT DOCUMENTS

| | | |
|---|---|---|
| 2009/0271456 A1 | 10/2009 | Kushwah |
| 2010/0049754 A1 | 2/2010 | Takaoka |
| 2010/0057992 A1* | 3/2010 | Hahn et al. .................... 711/115 |
| 2010/0114849 A1 | 5/2010 | Kingsbury |
| 2010/0115011 A1 | 5/2010 | Callahan |
| 2010/0125583 A1 | 5/2010 | Casper |
| 2010/0131474 A1* | 5/2010 | Zayas et al. .................. 707/691 |

* cited by examiner

MANAGING COUNTERS IN A DISTRIBUTED FILE SYSTEM

CROSS-REFERENCE TO RELATED APPLICATIONS

This application relates to the following patent applications which are filed concurrently herewith and incorporated herein by reference: U.S. patent application Ser. No. 12/261,064 entitled ALLOCATING PRIORITIES TO PREVENT DEADLOCKS IN A STORAGE SYSTEM, U.S. Pat. No. 8,560,524; PCT/US2008/081661 entitled CREATING SNAPSHOTS OF A FILE SYSTEM, International Publication No. WO02010/050943; PCT/US2008/081664 entitled ONLINE HECKING OF DATA STRUCTURES OF A FILE SYSTEM, International Publication No. WO2010/050944; U.S. patent application Ser. No. 12/261,069 entitled TRACKING MEMORY SPACE IN A STORAGE SYSTEM, U.S. Pat. No. 8,312,242; and U.S. patent application Ser. No. 12/261,071 entitled ENUMERATING METADATA IN FILE SYSTEM DIRECTORIES.

BACKGROUND

File systems organize and track where data is stored in memory and where free or available space exists in memory. Distributed or clustered file systems can store thousands or even millions of files. These files and the corresponding metadata are distributed across a large number of storage devices, such as disk drives.

Counters are used in the file system to track counts for various types of information. Many file systems use simple counters that are not distributed. This approach does not scale well on clustered file systems. Other file systems implement counters that cannot be recovered in the event of corruption without a scan of the entire file system by a file system checker (fsck). Such scans can be quite time-consuming for large file systems.

Methods and systems are needed to improve the management of counters in clustered file systems.

DETAILED DESCRIPTION

Exemplary embodiments relate to systems and methods for managing counters and counter information in a distributed or clustered file system.

Multiple cluster nodes cooperatively manipulate on-disk structures of the file system to provide symmetric read and write access. Metadata of the file system includes commonly accessed global counts that represent summarized state information of the file system. Exemplary embodiments provide a mechanism for maintaining these counts and providing both highly concurrent multi-node access to counters and data corruption protection in the form of bounded consistency checking and recoverability.

One exemplary embodiment uses Recoverable Distributed Counters (RDC) to provide a generalized mechanism for maintaining commonly accessed global file system counters. The exemplary embodiment also provides both highly concurrent multi-node access to the counters and data corruption protection in the form of bounded consistency checking and recoverability. Highly concurrent multi-node access means that multiple cluster nodes can concurrently both read and update the counter values with minimal contention over shared data structures while maximizing overall file system performance across the cluster. Bounded consistency checking and recoverability means that counter can be verified without having to perform any atomic operations of a size larger than some reasonable bound (independent of the size of the whole filesystem). This allows the verification to be performed online and concurrently with other filesystem operations.

Inconsistencies between count information are discovered and corrected using the RDC mechanism. This mechanism corrects the inconsistencies without scanning the entire filesystem to reconstruct a summary of the counters. The RDC mechanism protects various clustered file system capabilities against corruption. Such system capabilities include, but are not limited to, free space bookkeeping, counts for user, group and directory quotas, and per-inode counters such as block and link counts.

Figure 1:
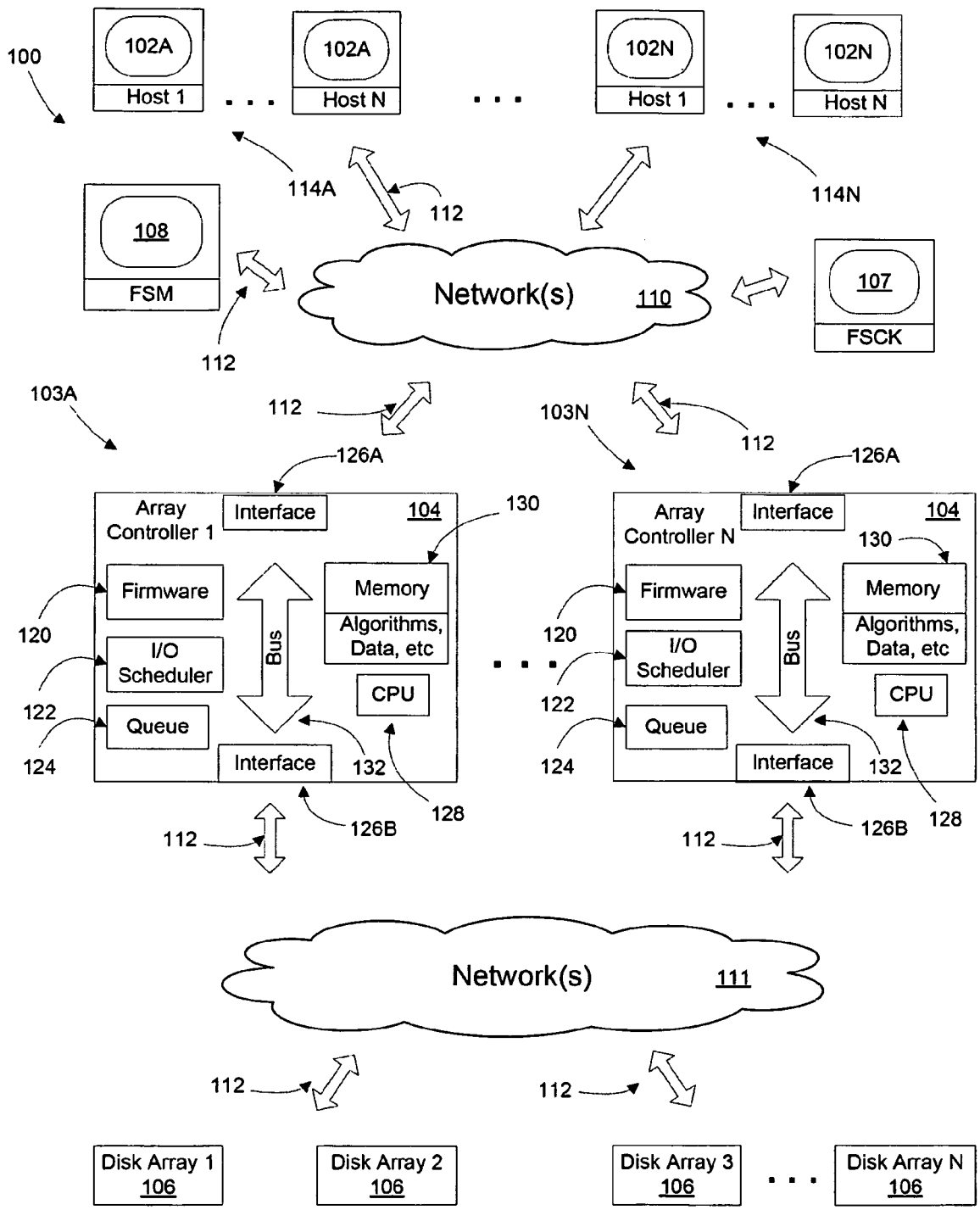
FIG. 1 shows a cluster file system in accordance with an exemplary embodiment of the present invention.

One exemplary embodiment is a clustered file system in which many computers simultaneously access disk data. FIG. 1 shows a distributed or cluster file storage system 100 in accordance with an exemplary embodiment of the present invention. By way of example, the system is a cluster storage network and/or a storage area network (SAN) that includes a plurality of client computers, nodes, or host computers 102A to 102N and one or more storage devices or arrays 103A to 103N that include one or more storage controllers 104 (shown by way of example as an array controller), a plurality of storage devices 106 (shown by way of example as disk array 1 to disk array N), a file system checker (fsck) 107, and a file system manager (FSM) 108 in communication with the storage controllers and devices. The filesystem manager 108 (such as a server or storage device) stores and organizes computer files so the files and corresponding data can be managed and discovered for the hosts 102A to 102N. In one exemplary embodiment, the filesystem storage manager 108 is replicated on all cluster nodes. The fsck 107 (such as run in a server or computer) is a tool for checking for consistency in the clustered file system.

The host computers are grouped to form one or more clusters (shown as cluster 114A to 114N). For example, hosts 102A are grouped to form a one cluster 114A which includes a plurality of host computers (shown as host 1 to host N). Hosts 102N are grouped to form another cluster 114N.

The clusters 114A to 114N and file system manager 108 are coupled to the array controllers 104 through one or more fabrics or networks 110, and the storage devices or arrays 103 are coupled to the storage devices 106 through one or more fabrics or networks 111. For instance, the hosts communicate with an array controller using a Small Computer System Interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the storage devices (such as array controller 104 and disk arrays 106) are network attached devices providing random access memory (RAM) and/or disk space (for storage and as virtual RAM) and/or some other form of storage or storage device, such as magnetic memory (example, tapes), micromechanical systems (MEMS), or optical disks, to name a few examples. Typically, storage devices include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices include one or more servers.

The storage controller 104 manages various data storage and retrieval operations. Storage controller 104 receives I/O requests or commands from the host computers 102A to 102N, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102A to 102N. For instance, processor 128 is coupled to a host interface 126A that provides bidirectional data communications to one or more host computers 102A to 102N. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

Figure 2:
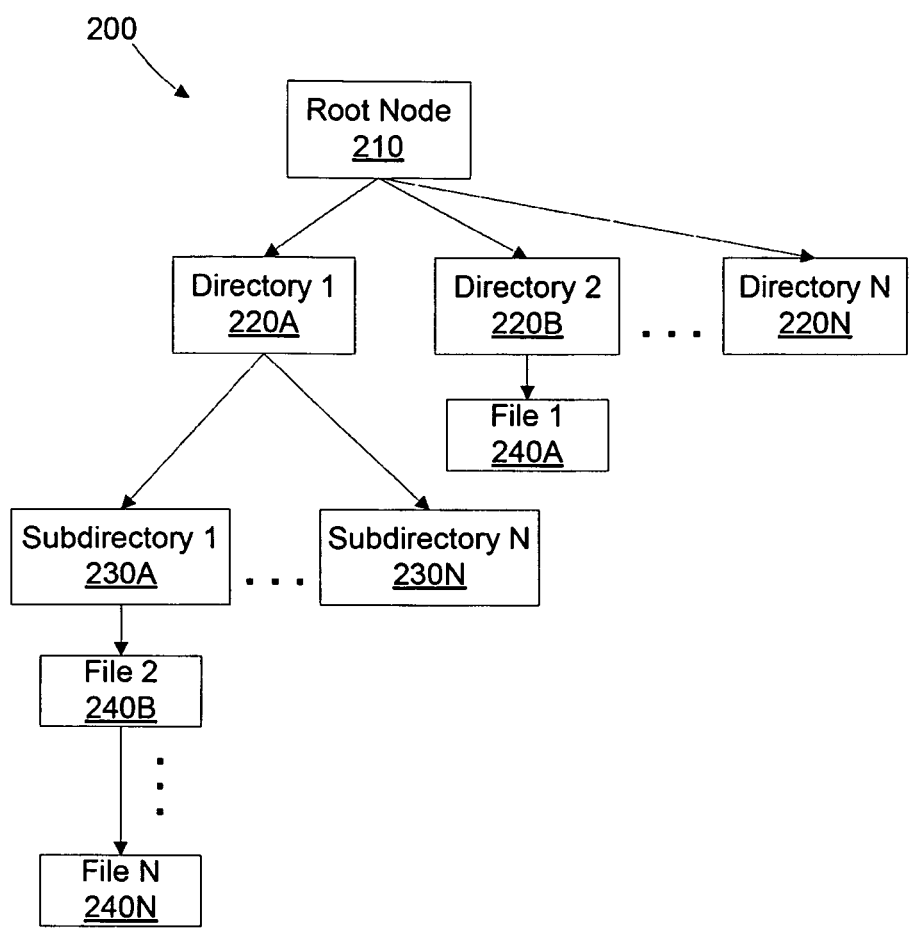
FIG. 2 shows a partial directory or hierarchical tree structure for a file system in accordance with an exemplary embodiment of the present invention.

FIG. 2 shows a partial directory or hierarchical tree structure 200 for a file system in accordance with an exemplary embodiment of the present invention. The directory includes a root node 210 with branches leading to a plurality of directories 220A, 220B, to 220N (shown as directory A to directory N). Directory 220A includes plural subdirectories 230A to 230N (shown as subdirectory 1 to subdirectory N). Each subdirectory further includes one or more files. For example, directory 220B has file 240A, and subdirectory 230A has files 240B to 240N (shown as file 2 to file N).

In one exemplary embodiment, each file contains a reference to a separate data structure that stores data or metadata about the file. For example, each file contains a storage location (for example, a block location for data or an inode number that refers to a block storing the inodes).

Figure 3:
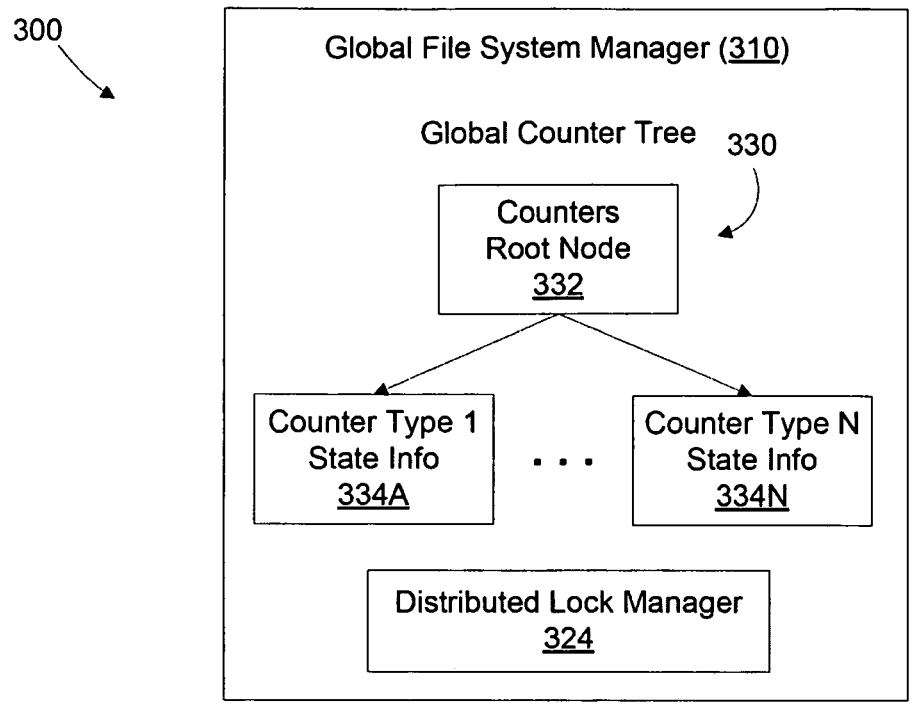
FIG. 3 shows a distribution of counters in trees and an exchange of counter information in a file system in accordance with an exemplary embodiment of the present invention.
Figure 3:
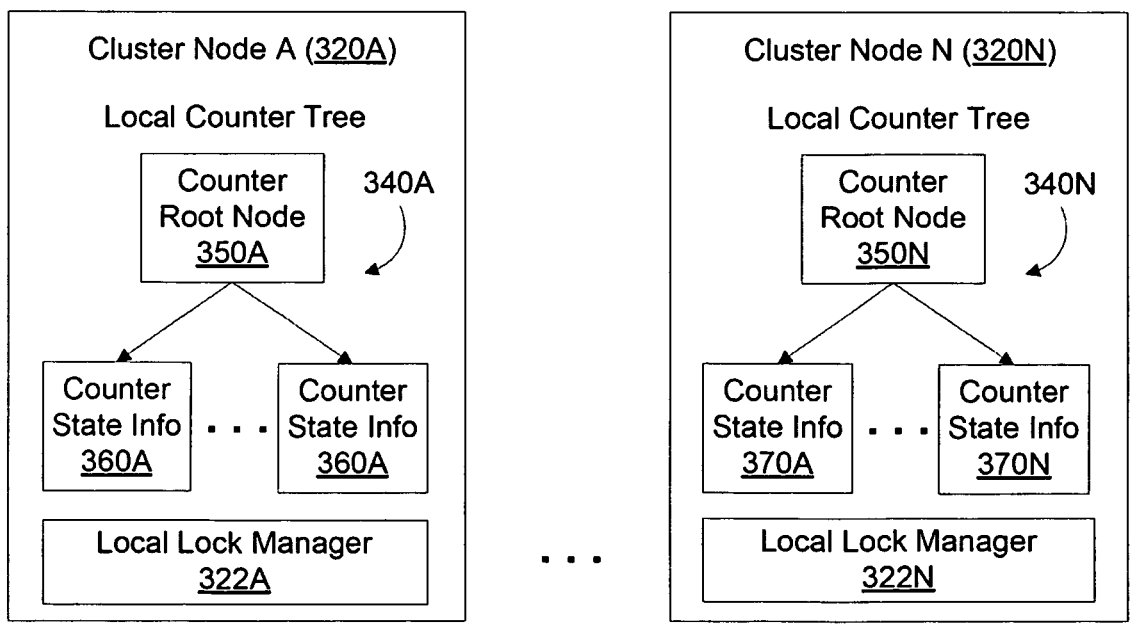

FIG. 3 shows a distribution of counters in trees and an exchange of counter information in a file system 300 in accordance with an exemplary embodiment of the present invention. The file system 300 includes a global file system manager 310 in communication with a plurality of clusters 320A to 320N (shown as cluster A to cluster N). Lock requests from local lock managers 322A to 322N in the clusters are made to a global lock manager 324 in communication with the global file system manager 310.

In the file system 300, the RDCs are stored as metadata using highly efficient and concurrent tree structures. A separate set of trees is used for each type of counter stored using RDCs. For example, FIG. 3 shows a global RDC tree 330 with a counters root node 332 and plural leaf or child nodes 334A to 334N. For each type of counter, the global RDC tree 330 contains centralized (non-distributed) information describing the state of the counters 334A to 334N (shown as counter type 1 storing state information to counter type N storing state information).

Each cluster node 320A to 320N participating in the RDC also has a local RDC tree 340A to 340N used for storing RDC data in a per-node (distributed) manner. Each local counter tree includes a counter root node 350A to 350N and plural leaf or child nodes 360A to 360N and 370A to 370N. Items in local RDC trees are allocated on an as-needed basis when a server needs to modify a particular distributed RDC and there is no corresponding RDC item in its local RDC tree.

The RDC mechanism allows for counter updates to be made in per-node data structures (the local RDC trees) without contending for data structures shared with other cluster nodes. When global counters are read in the common case, the per-server data stored in the local RDC trees can be quickly collected into a cluster-wide summary using a data passing mechanism provided by the cluster wide distributed lock manager. Local RDC tree items are collapsed back into the global tree for space efficiency when the counters are no longer under contention.

The RDC mechanism is also used for efficiently managing reservations for allocation pools such as those provided by file system quotas. The local RDC trees contain allocation pools from which each server can draw without further negotiation with other cluster nodes. When a server's local allocation pool, as represented in its local RDC tree, is exhausted, the allocation pool reservations are rebalanced across the cluster.

Figure 4:
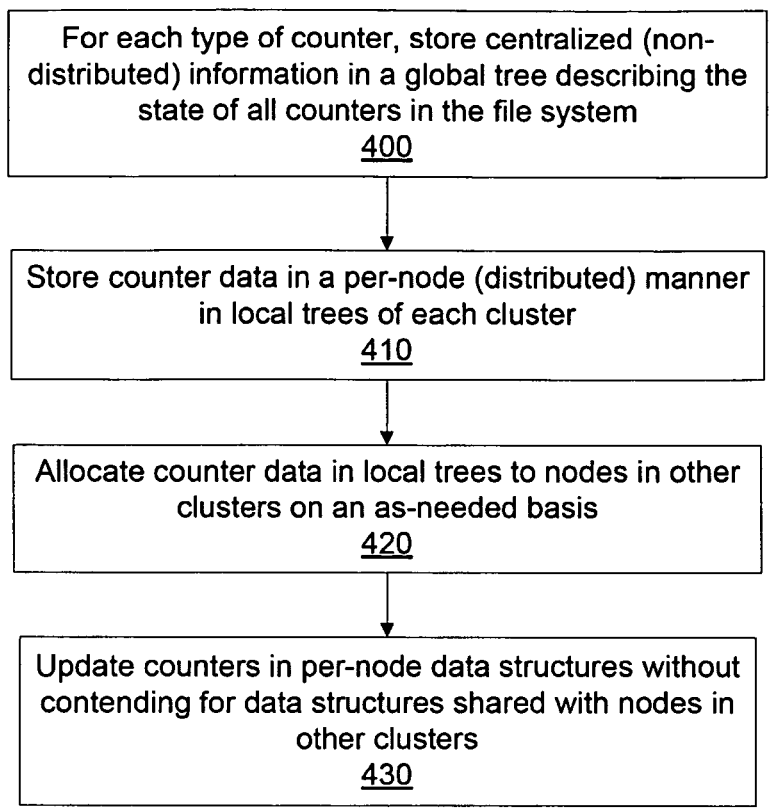
FIG. 4 shows a flow diagram for managing counters and allocating counter information in a cluster file system in accordance with an exemplary embodiment of the present invention.

FIG. 4 shows a flow diagram for managing counters and allocating counter information in a cluster file system in accordance with an exemplary embodiment of the present invention.

The consistency of RDC counters with the filesystem data that they summarize can be verified in a bounded manner, which is used to implement corruption detection and repair on the file system. This is achieved by logical division of RDC summary data, using vector or hierarchical bucketing. This logical division allows corruption detection and repair activities to be broken down into a set of discrete bounded operations. The mechanism also supports recovery of parts of an RDC without enumerating all counted items, enabling isolation and recovery of only a subset of counted items for which the RDC summary is suspect.

According to block 400, for each type of counter, centralized (non-distributed) information is stored in the global tree. This information describes the state of all counters in the file system.

According to block 410, counter data is stored in a per-node (distributed) manner in local trees of each cluster.

According to block 420, counter data in local trees is allocated to nodes in other clusters on an as-needed or as requested basis.

According to block 430, counters are updated in per-node data structures without contending for data structures that are being shared with nodes in other clusters.

In one embodiment, counters distributed across the file system are incrementally checked for consistency, and errors or inconsistencies discovered during the check are fixed while the file system is running and in use. The file system is not taken offline to perform a scan that checks for such inconsistencies. Instead, the file system is divided into multiple segments or chunks. By way of example, a 1000 gigabyte (G) file system could be divided into plural segments, such as segments of 1 G, 2 G, or 5 G size. Each segment is taken offline and checked while the remainder of the file system is online and running.

In one exemplary embodiment, the file system uses a hierarchical tree to track and store data, including counter and state information. Directories are represented as tree structures on storage devices (such as disk drives). Entries in the tree structure refer to separate blocks of memory that include the corresponding data for the file in the directory.

In some instances, the file system includes errors or mistakes, such as computer bugs, lost or misplaced data, corrupt data, etc. For example, counter information stored across the file system can be inconsistent.

In order to discover and correct errors, the file system uses a file checker (fsck) software tool or utility. The file checker is a program that navigates through a segment of the file system, discovers errors, and then corrects such errors. For example, the file checker repairs errors in the tree structure, such as errors in specifying counts in local or global counters, the location of files, errors in the free space bitmaps, etc.

Embodiments in accordance with the present invention provide new data structures or ways to store data in the file system to enable the file checker to run without taking the entire file system offline. In other words, the file checker navigates through the file system, discovers errors, and then corrects such errors while the file system remains mounted and available for use. User operations continue to execute through the file system without hanging or failing. In one exemplary embodiment, the file system is divided or separated into fragments, segments, or small chucks. These segments or chunks are searched with the file checker while the remaining portions of the file system remain online. For example, each segment defines a number of blocks that are examined to find and correct corruption.

Figure 5:
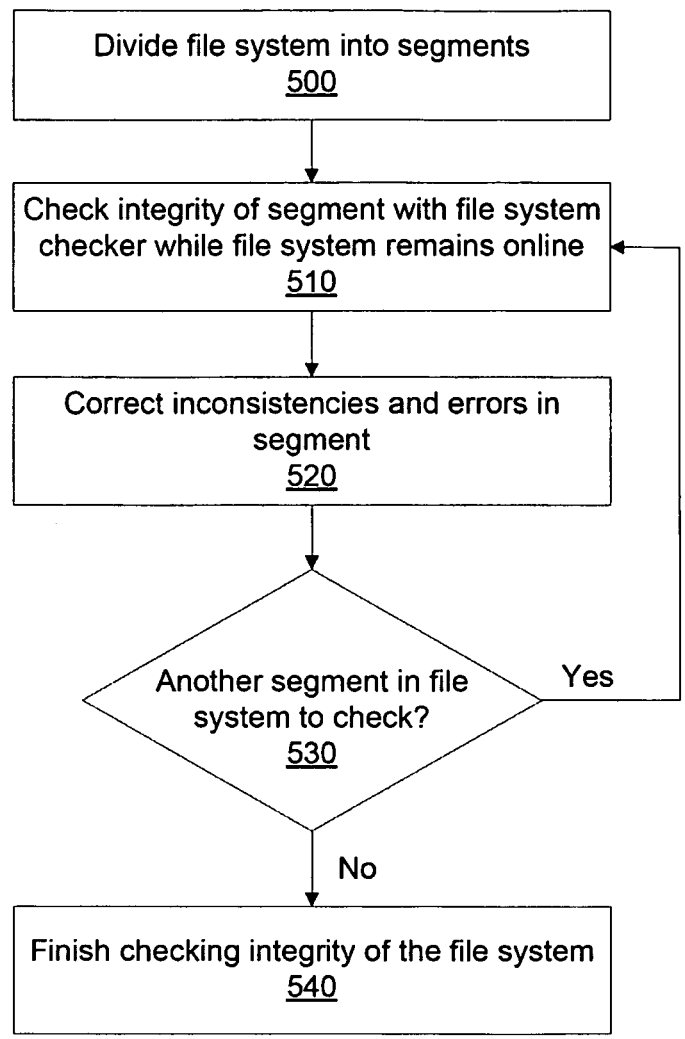
FIG. 5 shows a flow diagram for dividing a file system into segments and checking for inconsistencies while the file system remains online in accordance with an exemplary embodiment of the present invention.

FIG. 5 shows a flow diagram for dividing a file system into segments and checking for inconsistencies while the file system remains online in accordance with an exemplary embodiment of the present invention.

According to block 500, the file system is divided into discrete segments. By way of example, the file system is divided into a discrete number of storage blocks.

According to block 510, the integrity of the file system is checked with a file system checker while the file system remains online. The file system checker navigates through the selected segment and related portions of the file system to discover, errors, bugs, inconsistencies, lost/misplaced data, inaccuracies, etc. (such as errors stored in local and/or global counters).

According to block 520, the file system checker corrects inconsistencies or errors discovered in block 510. While a segment is being checked for inconsistencies, the segment is taken offline or made inaccessible.

According to block 530, a question is asked whether another segment in the file system will be checked with the file system checker. If the answer to this question is "yes" then flow proceeds back to block 510. If the answer to this question is "no" then flow proceeds to block 540. Here, the process ends since the file system checker is finished checking all of the segments and correcting discovered errors.

Figure 6:
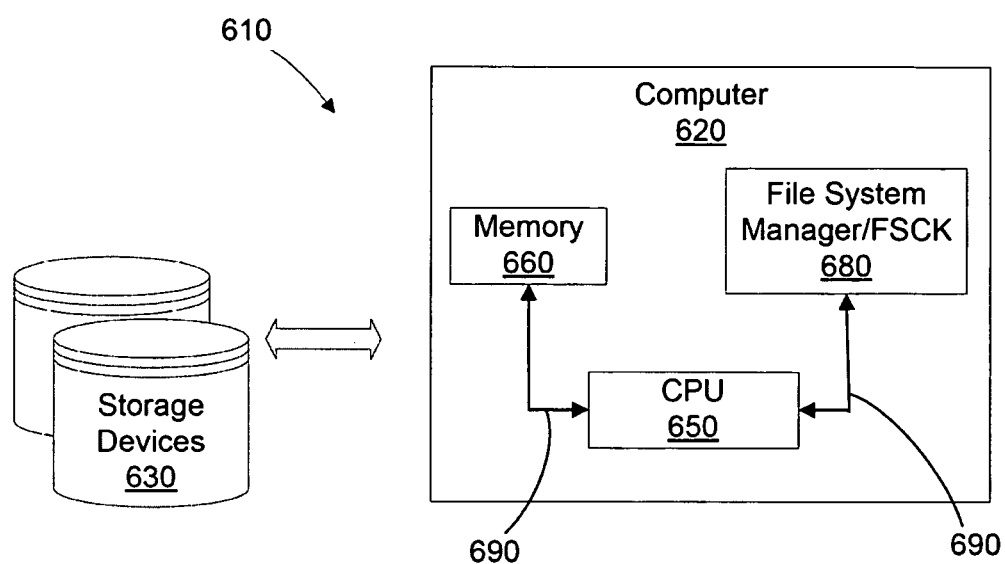
FIG. 6 shows an exemplary computer system for implementing one or more of the methods in accordance with an exemplary embodiment of the present invention.

FIG. 6 shows an exemplary computer system for implementing one or more of the methods in accordance with an exemplary embodiment of the present invention.

The computer system 610 includes a computer 620 coupled to storage devices 630. The computer 620 comprises a processing unit 650 (such as one or more processors of central processing units, CPUs) for controlling the overall operation of memory 660 (such as random access memory (RAM) for temporary data storage and read only memory (ROM) for permanent data storage) and one or more algorithms or programs 680 (such as a file system manager and/or a file system checker, fsck). The memory 660 stores data, control programs, and other data associate with the computer 620. Although shown separately, the memory 660 can store the programs 680. The processing unit 650 communicates with memory 660, storage devices 630, programs 680, and many other components via buses 690.

Embodiments in accordance with the present invention are not limited to any particular type or number of storage devices and/or computer. The computer system, for example, includes various portable and non-portable computers and/or electronic devices. Exemplary computer include, but are not limited to, servers, main frame computers, distributed computing devices, laptops, and other electronic devices and systems whether such devices and systems are portable or non-portable.

Definitions

As used herein and in the claims, the following words are defined as follows:

A "block" is a sequence of bytes or bits having a specified length or block size. Data is blocked (i.e., placed into blocks) to facilitate handling streams of data since data is typically read as a single block at a time. Most file systems are based on block devices that store and retrieve specified blocks of data. For example, a single file can be stored in multiple blocks.

A "block device" refers to a device through which the file system moves data in the form of blocks. Block devices are addressable device nodes, such as hard disks, CD-ROM, or memory regions.

A "checker" or "file system checker" or "fsck" refers to a software program that checks the consistency of a file system. The fsck traverses through the file system to discover inconsistent states and automatically corrects or fixes inconsistencies, problems, errors, etc. A system administrator can also manually run fsck.

A "cluster" is a group of two or more computers that work closely together so that they, in many respects, form a single computer. For example, a cluster is formed by linking multiple computers through a fast local area network (LAN) to improve performance and/or availability over a single computer.

A "data storage block" or "storage block" refers to specific areas in memory, such as a hard disk. For example, one data storage block is a collection of eight sectors or 4,096 bytes, referred to as 4K bytes.

A "directory" is an entity in a file system that contains a group of files or other directories. Related files are typically stored in a same directory. A directory contained inside a directory is a subdirectory. Together, multiple directories form a hierarchy or tree structure.

A "filesystem" or "file system" is a collection of file data, maintained by a filesystem implementation which is a set of data types, methods, and algorithms (typically implemented within an operating system instance) that store, organize, and maintain file data, frequently in some kind of file and/or directory hierarchy (albeit various alternatives and choices exist in the exact organizational structure made manifest by the filesystem implementation to the consumers of the file data). The actual file data and associated filesystem meta-data which describe the location, layout, directory organization, etc. of all file data within the filesystem is in turned stored on a data storage device (e.g., single hard disk, CD-ROM, disk storage array, network attached storage (NAS), etc.).

An "node" is a data structure that contains information about files (such as basic information about a regular file, directory, or other file system object). Inodes include information on files, such as, but not limited to, user ownership, access mode (read, write, execute permissions) and type. In one exemplary embodiment, each file has an inode and is identified by an inode number (i-number) in the file system where it resides. Inodes contain metadata (i.e., data about data) about the file.

The term "metadata" refers to data about data. Metadata can be stored in a separate file apart from the data itself. For example, file systems can store metadata in directory entries or in specialized structures, such as inodes. By way of example, metadata can include length of data stored as the number of blocks allocated for the file, a time and date when the file was modified, created, or last accessed, ownership identification, access permissions, etc.

A "node" is a basic unit used to build a tree or data structure. Each node includes data and possibly links (such as pointers or references) to other nodes. By way of example, nodes include root nodes, child nodes, and leaf nodes. A root node is the top most node of a tree data structure. A child node or internal node is an intermediate node between the root node and a leaf node. A leaf node or external node is a node of a tree data structure that has no child nodes (i.e., an end or bottom node).

The term "Recoverable Distributed Counters" or "RDC" refers to a structure that keeps track of a total count of some type of object within a large range of the filesystem. The RDC breaks down the total counts into partial counts of small ranges of the filesystem so that it can be checked and corrected piece-by-piece.

A "storage device" refers to any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

A "tree" is a data structure (i.e., a way to store data) that emulates a tree structure with a set of linked nodes.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. For example, the software is implemented as one or more modules. The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
dividing a clustered file system into plural segments;
independently checking each of the plural segments for inconsistency in a corresponding local counter associated with the corresponding segment, wherein the plural segments are associated with the corresponding local counters included in respective distributed computer nodes of the clustered file system;
allocating the local counter in a particular one of the computer nodes in response to the particular computer node having to modify distributed count information and the distributed count information not being located at the particular computer node;
using a file system checker to locate and correct an inconsistency in the local counter associated with a particular one of the plural segments while the clustered file system remains online with access available to file system data storing non-distributed global count information in a global tree in a global file manager separate from the computer nodes, the non-distributed global count information describing states of the local counters associated with the plural segments, wherein the global tree includes a root node linked to child nodes that describe the states of the respective local counters; and collapse information of the allocated local counter to the global count information at the global file system manager in response to contention of the allocated local counter no longer existing.

2. The method of claim 1, further comprising, storing distributed count information using the local counters.

3. The method of claim 1, wherein the computer nodes of the clustered file system can concurrently both read and update counter values in the local counters without contention over shared data structures.

4. The method of claim 1, wherein each of the local counters tracks a count of an object in the clustered file system.

5. The method of claim 1, wherein the collapsing of the information of the allocated local counter to the global count information is to achieve storage space efficiency at a corresponding one of the computer nodes.

6. The method of claim 5, wherein each of the computer nodes corresponds to a respective cluster of host nodes.

7. A non-transitory computer readable storage medium having instructions for causing a system to:

divide a clustered file system into plural segments;

independently check each of the plural segments for inconsistency in a corresponding local counter associated with the corresponding segment, wherein the plural segments are associated with the corresponding local counters included in respective distributed computer nodes of the clustered file system;

allocate the local counter in a particular one of the computer nodes in response to the particular computer node having to modify distributed count information and the distributed count information not being located at the particular computer node;

use a file system checker to locate and correct an inconsistency in the local counter associated with a particular one of the plural segments while the clustered file system remains online with access available to file system data;

store non-distributed global count information in a global tree in a global file manager separate from the computer nodes, the non-distributed global count information describing states of the local counters associated with the plural segments, wherein the global tree includes a root node linked to child nodes that describe the states of the respective local counters; and collapse information of the allocated local counter to the global count information at the global file system manager in response to contention of the allocated local counter no longer existing.

8. The non-transitory computer readable storage medium of claim 7, wherein the instructions further cause the system to verify counter information of both the local counter of a respective one of the computer nodes and the global tree without scanning the entire clustered file system.

9. The non-transitory computer readable storage medium of claim 7, wherein the instructions further cause the system to:

store allocation pools in each of the computer nodes in the clustered file system;

rebalance the allocation pools across the computer nodes when a local allocation pool of a computer node is exhausted.

10. The non-transitory computer readable storage medium of claim 7, wherein the instructions further cause the system to verify local count information stored in local trees associated with the plural segments of the clustered file system while the clustered file system remains online with access available to clustered file system data, wherein the local count information stored in the local trees corresponds to respective ones of the local counters.

11. The non-transitory computer readable storage medium of claim 7, wherein each of the local counters tracks a count of an object in the clustered file system.

12. A server, comprising:

a file system manager including a processor to execute instructions stored in memory to:

divide a clustered file system having multiple distributed computer nodes into plural segments;

use a file system checker to independently check each of the plural segments for inconsistencies in distributed local count information provided by local counters in the respective computer nodes of the clustered file system, the check for the inconsistencies being performed while the clustered file system remains online, wherein the file system manager is separate from the computer nodes;

allocate the local counter in a particular one of the computer nodes in response to the particular computer node having to modify distributed count information and the distributed count information not being located at the particular computer node;

store non-distributed global count information that describes a state of the local count information of each of the local counters, wherein the global count information is in a global tree of the file system manager, the global tree including a root node linked to child nodes that describe states of the respective local counters; and collapse information of the allocated local counter to the global count information at the global file system manager in response to contention of the allocated local counter no longer existing.

13. The server of claim 12, wherein a given segment is rendered inaccessible while the given segment is checked for inconsistencies.

14. The server of claim 12, wherein the clustered file system is logically divided so corruption detection of the inconsistencies and repair of the inconsistencies are broken down into a set of discrete bounded operations.

15. The server of claim 12, wherein the local count information associated with each of the segments corresponds to a respective one of the local counters that is to track a count of an object in the clustered file system.

* * * * *

UNITED STATES PATENT AND TRADEMARK OFFICE
CERTIFICATE OF CORRECTION

| | | |
|---|---|---|
| PATENT NO. | : 9,176,963 B2 | Page 1 of 1 |
| APPLICATION NO. | : 12/261068 | |
| DATED | : November 3, 2015 | |
| INVENTOR(S) | : Michael J. Callahan et al. | |

It is certified that error appears in the above-identified patent and that said Letters Patent is hereby corrected as shown below:

In the Claims

In column 8, line 65, in Claim 1, delete "data" and insert -- data; --, therefor.

Signed and Sealed this
Twenty-sixth Day of April, 2016

Michelle K. Lee
*Director of the United States Patent and Trademark Office*